No. 836,862. PATENTED NOV. 27, 1906.
F. CHATEAUNEUF.
STITCH INDENTING MACHINE.
APPLICATION FILED JAN. 12, 1906.
3 SHEETS—SHEET 1.
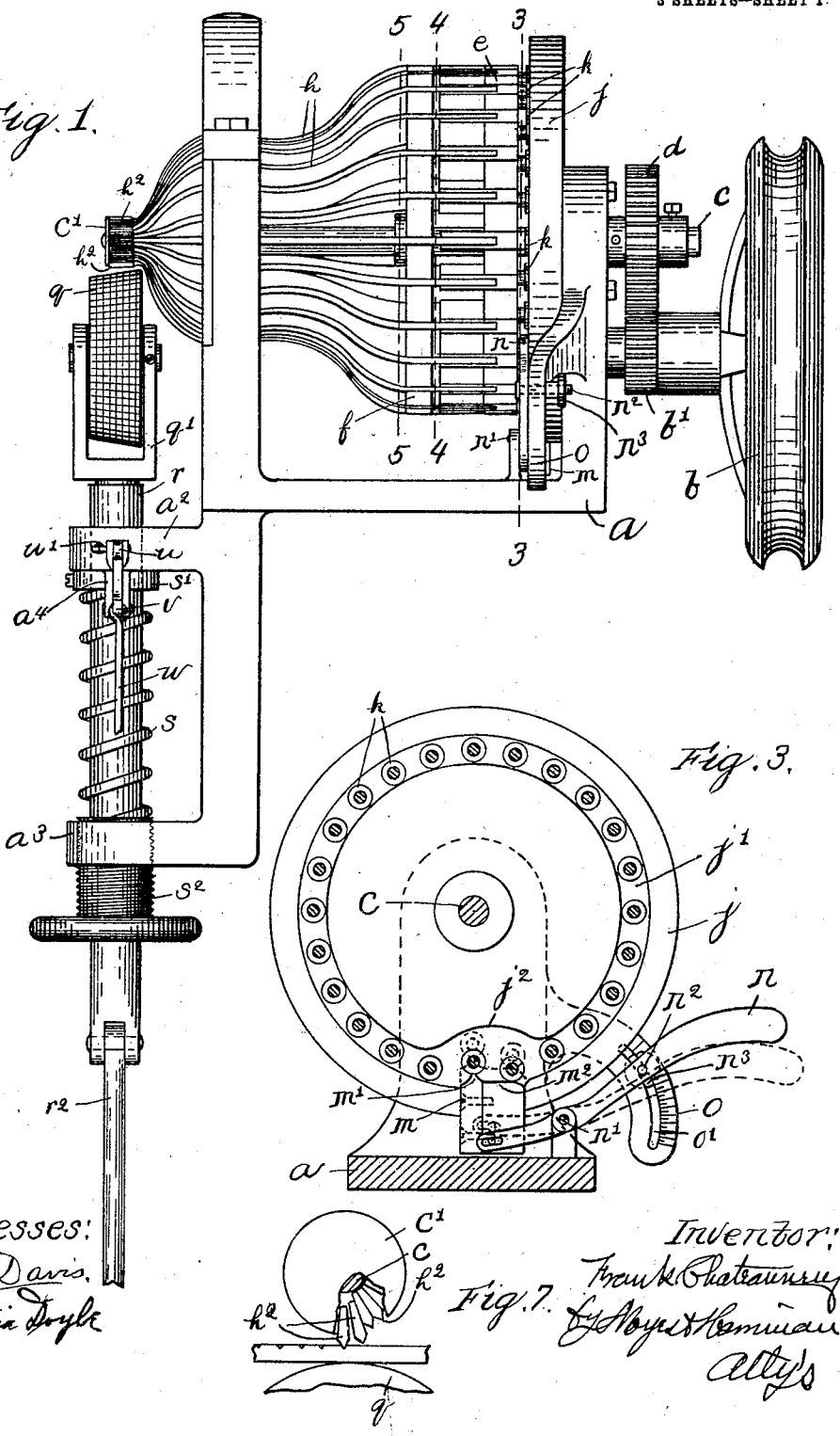
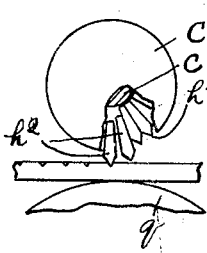
Witnesses:
H. B. Davis.
Cynthia Doyle.
Inventor:
Frank Chateauneuf No. 836,862. PATENTED NOV. 27, 1906.
F. CHATEAUNEUF.
STITCH INDENTING MACHINE.
APPLICATION FILED JAN. 12, 1906.

3 SHEETS—SHEET 3.

UNITED STATES PATENT OFFICE.

FRANK CHATEAUNEUF, OF HAVERHILL, MASSACHUSETTS.

STITCH-INDENTING MACHINE.

No. 836,862.  Specification of Letters Patent.  Patented Nov. 27, 1906.

Application filed January 12, 1906. Serial No. 295,677.

*To all whom it may concern:*

Be it known that I, FRANK CHATEAUNEUF, of Haverhill, county of Essex, State of Massachusetts, have invented an Improvement in Stitch-Indenting Machines, of which the following description, in connection with the accompanying drawings, is a specification, like characters on the drawings representing like parts.

This invention relates to that class of machines which are adapted to make a transverse indentation on the welt or upper edge of the sole of a shoe between the stitches, and has for its object to provide a simplified form of machine of this character and which is, moreover, adapted to be readily adjusted for varying conditions and different lengths of stitches and which is simple in construction and unlikely to get out of order.

I accomplish this object in a general way by providing a series of circularly-arranged blades or teeth, which together practically constitute a wheel, said blades or teeth being adapted to be moved automatically to engage the work and to be adjusted so as practically to vary the circular distance between the work-engaging edges thereof in accordance with the variations in the length of the stitches.

For an understanding of my invention reference is made to the accompanying drawings, in which—

Figure 2:
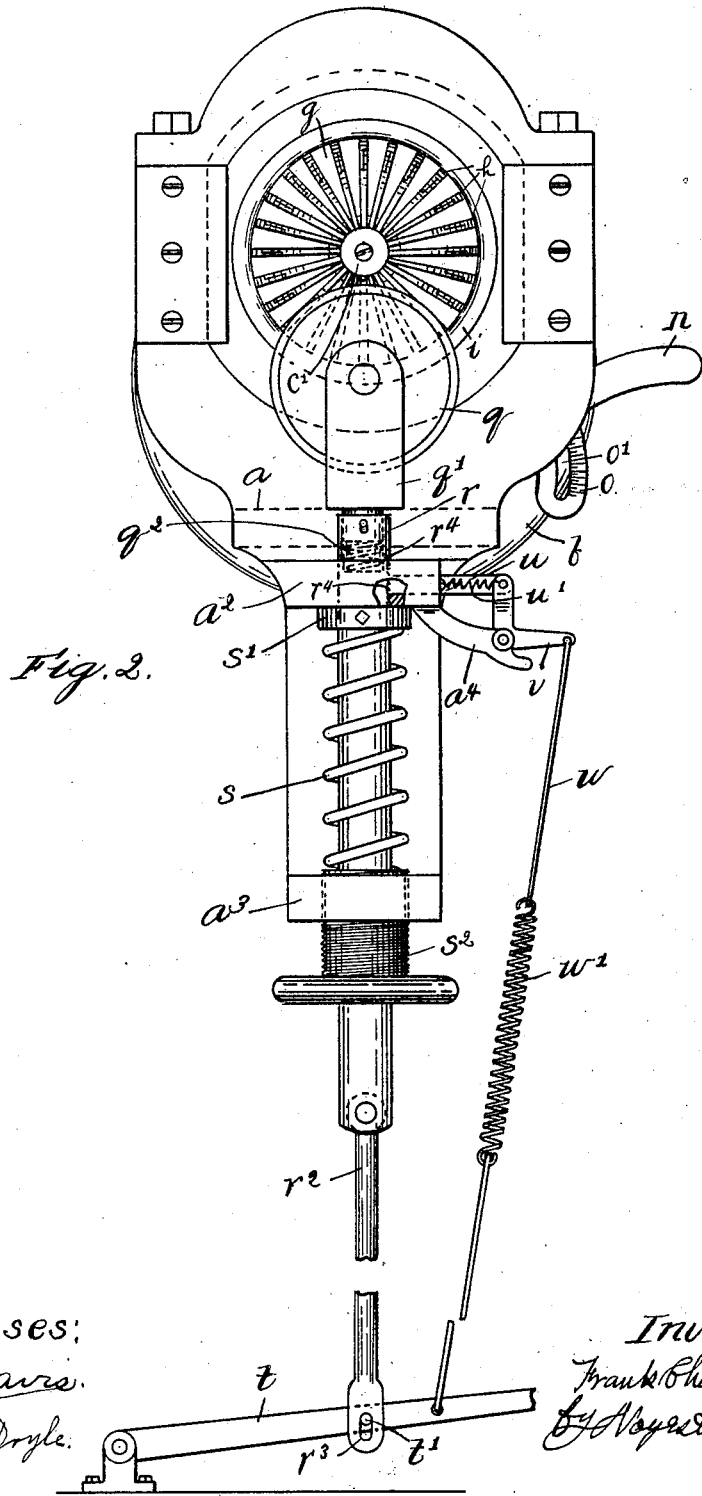
Figure 4:
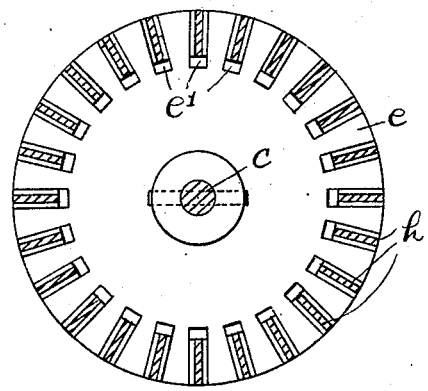
Figure 5:
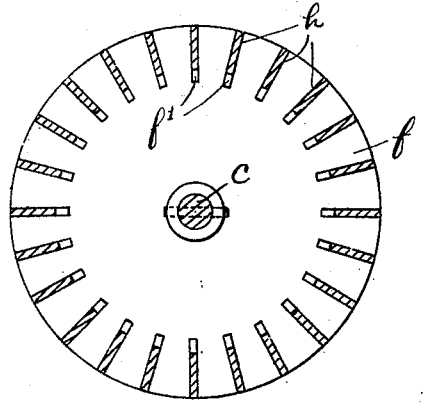
Figure 6:
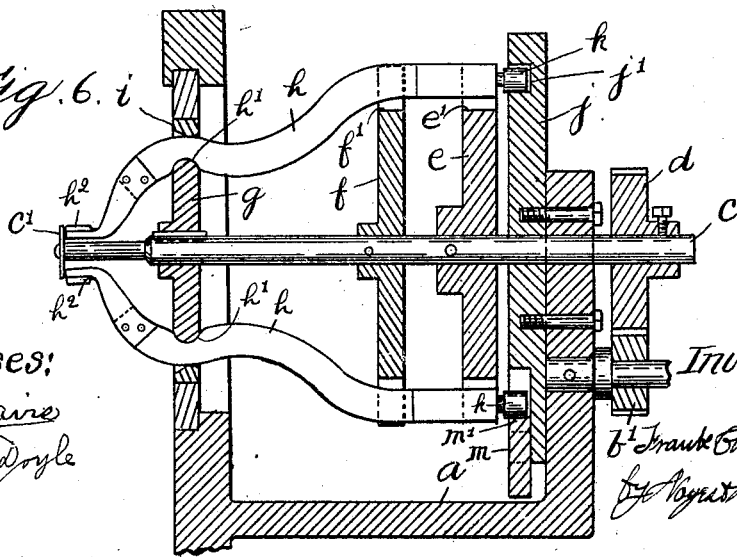

Figure 1 is a side elevation of a stitch-separating machine made in accordance with my invention. Fig. 2 is a front elevation thereof. Fig. 3 is a sectional view on the line 3 3 of Fig. 1. Fig. 4 is a sectional view on the line 4 4 of Fig. 1. Fig. 5 is a sectional view on the line 5 5 of Fig. 1. Fig. 6 is a longitudinal vertical sectional view. Fig. 7 is a detail view showing the action of the stitch-indenting devices on the work.

Journaled on the frame $a$ of the machine is a driving-wheel $b$, to which a gear $b'$ is connected. A shaft $c$ is journaled in the frame $a$ and has a gear $d$ secured thereto, which is driven from the gear $b'$. Two circular supports $e$ and $f$ are secured to the shaft $c$ at suitable distances apart thereon, and each of said disks are provided with a series of radially-extending notches $e'$ and $f'$, which are respectively provided in the peripheral portions thereof. A disk $g$, having a rounded edge, is also secured to the shaft $c$, and a series of flat levers $h$ are arranged in said slots $e'f'$ and are provided with curved recesses $h'$ in their inner edges, in which the rounded edge portion of the disk $g$ is located. Said levers $h$ all extend longitudinally of the shaft $c$ and converge toward the front end thereof until their inner edges bear against the shaft, each one of said levers being provided with a knife or blade $h^2$ at its front end, which extends radially of the shaft $c$. Said ends of said levers bearing said knives $h'$ are wedge-shaped and are arranged so closely together that they lie against each other when in their innermost positions, bearing against the shaft $c$. In this position the edges of said knives $h^2$ are a uniform distance from the axis of shaft $c$, so that they practically constitute a toothed or bladed wheel having an axis coincident with the axis of shaft $c$. A disk $c'$ is secured to the front end of shaft $c$, the diameter of which is practically the same as the diameter of the toothed wheel formed by knives $k^2$. A ring $i$ is supported in the frame and is adapted to engage the outer sides of the levers $h$ at a point directly opposite the disk $g$, so that said ring holds the levers in contact with said disk. A roll $k$ is journaled on the end of each lever, the bearing of said rolls extending longitudinally thereof, and a stationary cam $j$ is mounted on the frame, said cam being provided with an annular groove $j'$, in which said rollers $k$ are located and adapted to move freely. Said cam is provided with an adjustable member $m$, one end of which extends into groove $j'$, said member being slidably mounted in said cam, so that it will move radially of shaft $c$. A lever $n$ is pivoted on the frame at $n'$ and is pivotally connected at one end to said member $m$, so that said lever may be employed to adjust member $m$ radially.

Any convenient means for locking the lever $n$ and showing the position to which it is adjusted may be provided—as, for instance, the arm $o$, having a graduated surface, and a slot $o'$, through which and through the lever $n$ a locking-bolt $n^2$ is passed, a clamping-nut $n^3$ being provided on said bolt, as will be obvious.

The roll-engaging surface of cam member $m$, comprises a projecting portion $m'$ and a slightly-curved portion $m^2$, which latter when the member is in its retracted position is practically continuous with the outer side of groove $j'$. (See Fig. 3.) A recess $j^2$ is formed in cam $j$, which leads from groove $j'$ directly opposite member $m$. A work-supporting-wheel $q$ is mounted in a head $q'$, and the latter is mounted in a socket formed in the upper end of a vertically-movable rod $r$, and a stiff spring $q^2$ is located in the bottom of said socket. Said rod is mounted in lugs $a^2$ $a^3$ on the frame, and a spring $s$ is arranged thereon between the lug $a^3$ and a collar $s'$, which is secured to said rod, a screw $s^2$ being threaded in lugs $a^2$ for varying the tension of said spring. The lower end of the rod $r$ is connected by a link $r^2$ to a foot-lever $t$, a pin $t'$ in the lever being located in a slot $r^3$ in the link, so that the rod $r$ may be drawn downward by the foot-lever. A pawl $u$ is arranged in the lug $a^2$, said pawl having a series of teeth on its end which are inclined on their under sides and adapted to engage corresponding, but oppositely-inclined, teeth $r^4$ on the rod $r$, and a spring $u'$ is connected to the pawl $u$ and acts to draw the same into engagement with the teeth $r^4$. A bell-crank lever $v$ is pivoted on a bracket-arm $a^4$ on the frame, and one end of said bell-crank lever is connected to the pawl $u$, and the other end is connected to the foot-lever $t$ by means of a link $w$, having an intermediate spring $w'$.

In operation when the shaft $c$ is rotated the rollers $k$ on the ends of the levers $h$ will be successively carried into engagement with the raised portion $m'$ of the cam member $m$, causing said rollers to ride up over said projection, as best illustrated in Fig. 3. The sides of said portion $m'$ are as abrupt as practicable, so that the end of the lever bearing the roll will be lifted quickly. The result is that as each lever is thus raised it will be swung about the edge of disk $g$ as a pivot, moving the blade $h^2$ thereof downwardly or radially with relation to the axis of the shaft $c$ toward the supporting-wheel $g$. The cam projection $m'$ is so arranged that this movement will take place approximately on the instant that the lever is in the vertical plane which passes through the axis of the shaft $c$, so that the edge of said blade $h^2$ will be moved in toward wheel $q$. As soon as the roller has passed over the upper end of projection $m'$ the lever will be moved back to its normal position either by gravity or by the engagement of the roll with the upper side of groove $j'$. It will be observed that the knife-edges are in close proximity to the axis of shaft $c$ as compared with the rolls $k$, so that the circular distance through which they travel in a given time is comparatively small, and the downward-and-upward movement of the knives will be rapid notwithstanding the fact that the distance through which the rolls $k$ move circularly during this movement is much greater than the distance between the knife-edges. When the treadle $t$ is depressed, the first action will be to draw down on the link $w$, swinging the lever $v$ and withdrawing the pawl $u$ out of engagement with the rod $r$. As soon as this pawl is drawn out of engagement with said rod the pin $t'$ on the foot-lever will engage the link $r^2$ at the lower end of its slot $r^3$, so that the rod $r$ will be drawn down against the action of the spring $s$, lowering the feed-wheel $g$ sufficiently to permit the insertion of the edge of the sole between the surface of the feed-wheel and the surface of the wheel formed by the series of knives $h^2$. The treadle is then released so that the spring $s$ moves the wheel $g$ upwardly until the upper edge of the sole is pressed against the edges of the knives $h^2$. One of the knives $h^2$ will be started between the stitches, and as the knives are circularly arranged at a distance apart equal the distance between the stitches when the shaft $c$ is rotated they will successively engage the edge of the sole or welt between each stitch in a manner similar to other devices of this character. However, as each knife is brought into the vertical position before described it will be forced downwardly, and as the wheel $q$ will be rigidly supported and prevented from downward movement by the pawl $u$ the knife will be forced into the work, making the desired indentation. This action is performed by each knife $h^2$ successively as the wheel which they constitute rolls around the sole edge. Usually the thickness of the sole and welt is approximately uniform throughout; but in case it should not be the spring-cushion $q^2$ permits the wheel $q$ to yield slightly and to an extent sufficient to allow for all of such irregularities, said spring $q^2$ being of sufficient strength to prevent downward movement of the wheel $q$ under ordinary conditions, it being intended that it yield only under the special conditions above referred to.

In practice the circular distance between the edges of the knives $h^2$ will be no greater than the distance between the shortest stitches with which the work to be operated upon is provided; but in case a longer stitch is used I force down the lever $n$, so that the cam member $m$ will be raised from the full-line position of Fig. 3 to a point somewhat above said position—as, for instance, the dotted position in said figure—so that two of said rolls $k$ will be simultaneously engaged and lifted. The result is that before a knife $h^2$ is brought into engagement with the work it will be moved outwardly to some extent by movement of the corresponding roll $k$ upon the face $m^3$, as shown in Fig. 7 and dotted lines in Fig. 3, and, as all the blades move radially, it follows that the circular distance between the edge of the knife thus moved and the adjacent knives will be increased, so that the knife which is thus forced out will engage the work at a point somewhat in advance of the point at which it would engage the work if it were not moved outwardly until it was approximately in the vertical plane of the axis of the shaft $c$. The distance between the points at which the successive knives engage the work will thus be correspondingly increased and obviously may be increased according to the varying lengths of the stitches. The graduated scale on the arm $o$ is preferably provided so that the lever $n$ may be set in positions corresponding to the length of the stitches. In other words, by this means I practically vary the radius of the toothed wheel $h^2$ or the circular distance between the knife edges or teeth of the wheel formed by said knives. The supports $e$ and $f$ securely hold the levers $f$ and $h$ from side motion.

Inasmuch as the knives will become dulled or worn or broken in time, so that they will have to be renewed, said levers are preferably provided with removable end portions which bear the knives $h^2$. Said portions may be connected by a common lap-joint or any other suitable manner, as illustrated in Fig. 6.

Having thus described my invention, what I claim as new, and desire to secure by Letters Patent, is—

1. In a stitch-indenting machine, a rotatable indenting-wheel comprising a series of radially-movable work-engaging devices, substantially as described.

2. In a stitch-indenting machine, a rotatable wheel comprising a series of circularly-arranged indenting-knives having their edges arranged to travel in a circular path, and means for moving said knives to carry their edges outside said path, substantially as described.

3. In a stitch-indenting machine, a work-support, a series of circularly-arranged indenting-knives, means for moving said knives so that their edges travel in a circular path adjacent said support, and means for moving said knives radially toward the said support, substantially as described.

4. In a stitch-indenting machine, a work-support, a series of circularly-arranged indenting-knives, means for moving said knives so that their edges travel in a circular path adjacent said support, and means for moving said knives successively toward said support, substantially as described.

5. In a stitch-indenting machine, a work-support, a rotatable shaft, a series of arms extending longitudinally of said shaft, indenting-knives borne by said arms, connections between said shaft and arms whereby the latter may be moved circularly to carry said knives in a path adjacent said support, and means for moving each arm radially as its respective knife is carried adjacent said support, substantially as described.

6. In a stitch-indenting machine, a work-support, a rotatable shaft, a series of arms extending longitudinally of said shaft, indenting-knives borne by said arms, connections between said shaft and arms whereby the latter may be moved circularly to carry said knives in a path adjacent said support, and a stationary cam for moving each arm radially as its respective knife is carried adjacent said support, substantially as described.

7. In a stitch-indenting machine, a work-support, a rotatable shaft, a series of arms extending longitudinally of said shaft, indenting-knives borne by said arms, connections between said shaft and arms whereby the latter may be moved circularly to carry said knives in a path adjacent said support, and a radially-adjustable, stationary cam for moving each arm radially through different distances as the knife of each arm is carried adjacent said support, substantially as described.

8. In a stitch-indenting machine, an indenting-wheel comprising a series of circularly-arranged, and uniformly circularly spaced indenting-knives, and means for varying the circular distance between the edges of said knives, substantially as described.

9. In a stitch-indenting machine, a work-support, a rotatable shaft, a series of arms extending longitudinally of said shaft, indenting-knives borne by said arms, connections between said shaft and arms whereby the latter may be moved circularly to carry said knives in a path adjacent said support, and means for moving a plurality of said arms radially to carry the edges of their respective knives outside said path simultaneously, to vary the circular distance between said edges, substantially as described.

10. In a stitch-indenting machine, a work-support, a rotatable shaft, a series of arms extending longitudinally of said shaft, indenting-knives borne by said arms, connections between said shaft and arms whereby the latter may be moved circularly to carry said knives in a path adjacent said support, a stationary cam arranged simultaneously to engage a plurality of said arms to move them radially, and means for adjusting said cam to vary the extent of said radial movement.

11. In a stitch-indenting machine, a rotatable shaft, a series of lever-arms arranged about said shaft, pivotally mounted thereon, and extending longitudinally thereof, said arms having radially and longitudinally extending indenting-knives, and a cam for swinging said arms as the shaft is rotated to move said knives radially outward in succession, substantially as described.

12. In a stitch-indenting machine, a work-support, a rotatable shaft, a series of levers extending longitudinally thereof, supports for said levers mounted on said shaft having radial slots in which said levers are located, a series of indenting-knives borne by said levers adjacent said support, and means for swinging each lever radially to move its knife toward said support as it is carried past the same, substantially as described.

13. In a machine of the character described, a work-support, a rotatable shaft, a series of levers pivotally mounted on said shaft to swing radially thereof, and having indenting-knives at their front ends arranged circularly with relation to the axis of the shaft adjacent said support, rolls journaled on the opposite ends of said levers, and a stationary cam arranged to engage said rolls as said shaft is rotated, substantially as described.

In testimony whereof I have signed my name to this specification in the presence of two subscribing witnesses.

FRANK CHATEAUNEUF.

Witnesses:
L. H. HARRIMAN,
H. B. DAVIS.